US009090308B2

(12) United States Patent
Chiang (10) Patent No.: US 9,090,308 B2
(45) Date of Patent: Jul. 28, 2015

(54) DUAL-WHEEL SYNCHRONOUS BRAKE AUXILIARY DEVICE WITH ENERGY-SAVING FUNCTION

(71) Applicant: AP Machinery Corp., Changhua Hsien (TW)

(72) Inventor: Chih-Hsiang Chiang, Changhua County (TW)

(73) Assignee: AP Machinery Corp., Changhua Hsien (TW)

( * ) Notice: Subject to any disclaimer, the term of this patent is extended or adjusted under 35 U.S.C. 154(b) by 0 days.

(21) Appl. No.: 14/164,545

(22) Filed: Jan. 27, 2014

(65) Prior Publication Data

US 2014/0216861 A1 Aug. 7, 2014

(30) Foreign Application Priority Data

Feb. 7, 2013 (TW) .............................. 102202630 U (51) Int. Cl.
*B62L 3/02* (2006.01)
*B62L 3/08* (2006.01)
*B60T 11/06* (2006.01)
*B60T 7/10* (2006.01)
*F16D 125/60* (2012.01)

(52) U.S. Cl.
CPC . *B62L 3/08* (2013.01); *B60T 7/102* (2013.01); *B60T 11/06* (2013.01); *B62L 3/02* (2013.01); *F16D 2125/60* (2013.01)

(58) Field of Classification Search
CPC ......... B60T 11/046; B60T 11/06; B62L 3/02; B62K 23/06; F16D 2125/60; F16D 2125/62
See application file for complete search history.

(56) References Cited

U.S. PATENT DOCUMENTS

| 4,057,127 | A | * | 11/1977 | Woodring | .................. | 188/24.16 |
| 5,829,314 | A | * | 11/1998 | Scura | ........................... | 74/502.4 |
| 5,927,442 | A | * | 7/1999 | Liao | .......................... | 188/24.16 |
| 6,085,611 | A | * | 7/2000 | Valdez | ......................... | 74/501.6 |
| 6,098,486 | A | * | 8/2000 | Liao | ........................... | 74/500.5 |
| 2002/0088297 | A1 | * | 7/2002 | Lin | ............................ | 74/500.5 |
| 2002/0146280 | A1 | * | 10/2002 | Wu | ............................... | 403/300 |
| 2002/0175028 | A1 | * | 11/2002 | Liu | .......................... | 188/24.21 |
| 2011/0100764 | A1 | * | 5/2011 | Hung | ......................... | 188/24.22 |

FOREIGN PATENT DOCUMENTS

| EP | 2639123 | A1 | * | 9/2013 |
| FR | 908924 | A | * | 7/1945 |
| FR | 920467 | A | * | 10/1945 |
| FR | 957019 | A | * | 2/1950 |
| WO | WO2012/009683 | A1 | * | 1/2012 |

\* cited by examiner

*Primary Examiner* — Anna Momper
(74) *Attorney, Agent, or Firm* — Alan D. Kamrath; Kamrath IP Lawfirm, P.A.

(57) ABSTRACT

A brake auxiliary device includes a first connecting module, a brake cable unit connected with the first connecting module, a second connecting module connected with the brake cable unit, a first brake cable connected with the second connecting module, and a second brake cable connected with the second connecting module. The brake cable unit is connected to a front brake of a bicycle. The second brake cable is connected to a rear brake of the bicycle. Thus, when one of the two brake levers of the bicycle is driven, the rear wheel is initially braked, and the front wheel is then braked after the rear wheel is braked. In addition, when the other one of the two brake levers is driven, the rear wheel is braked.

10 Claims, 7 Drawing Sheets

DUAL-WHEEL SYNCHRONOUS BRAKE AUXILIARY DEVICE WITH ENERGY-SAVING FUNCTION

BACKGROUND OF THE INVENTION

1. Field of the Invention

The present invention relates to a brake auxiliary device and, more particularly, to a brake auxiliary device for a double wheeled vehicle.

2. Description of the Related Art

A conventional double wheeled vehicle, such as a bicycle, motorcycle and the like, comprises a front brake for braking a front wheel and a rear brake for braking a rear wheel. The front brake is connected to a right brake lever by a first brake cable, and the rear brake is connected to a left brake lever by a second brake cable. Thus, the left brake lever is controlled by the rider's left hand to brake the rear wheel, and the right brake lever is controlled by the rider's right hand to brake the front wheel. Usually, the rear wheel is initially braked, and the front wheel is then braked so as to stop the bicycle safely. However, when the front wheel is firstly braked before the rear wheel is braked during an emergency condition when the wheeled vehicle is ridden at a high speed, the wheeled vehicle is not balanced and easily slips and falls down, thereby greatly causing danger to the rider.

BRIEF SUMMARY OF THE INVENTION

The present invention is to provide a dual-wheel synchronous brake auxiliary device with an energy-saving function.

In accordance with the present invention, there is provided a brake auxiliary device, comprising a first connecting module, a brake cable unit connected with the first connecting module, a second connecting module connected with the brake cable unit, a first brake cable connected with the second connecting module, and a second brake cable connected with the second connecting module. The first connecting module includes a casing, a driving block mounted in the casing, and a cover plate mounted on the casing to cover the driving block. The casing has a first end portion, a second end portion and a third end portion. The first end portion of the casing is provided with a support section for mounting the driving block. The second end portion of the casing is provided with an upper entrance. The third end portion of the casing is provided with a lower entrance and a slit. The driving block is provided with a mounting hole, a first slot and a second slot. The second connecting module includes a housing, a mounting base mounted in the housing, and a cap mounted on the housing to cover the mounting base. The housing has a bottom provided with a mounting bore. The mounting base has a side provided with a chamber. The mounting base has a front end provided with a first aperture and a recess. The mounting base has a rear end provided with a second aperture and a third aperture. The cap is provided with a first channel and a second channel. The brake cable unit is pivotally connected with the driving block of the first connecting module. The brake cable unit is connected to a front brake of a bicycle. The second brake cable is connected to a rear brake of the bicycle.

The control cable of the brake cable unit has a first end abutting the first slot of the driving block and a second end connected to a right brake lever of the bicycle. The front brake cable of the brake cable unit has a first end abutting the mounting hole of the driving block and a second end connected to the front brake of the bicycle. The first brake cable has a first end received in the chamber of the mounting base and spaced from the recess of the mounting base and a second end connected to a left brake lever of the bicycle. The second brake cable has a first end received in the chamber of the mounting base and abutting the third aperture of the mounting base and a second end connected to the rear brake of the bicycle.

According to the primary advantage of the present invention, when one of the two brake levers of the bicycle is driven, the rear wheel is initially braked, and the front wheel is then braked after the rear wheel is braked, so that the rider only needs to operate one of the two brake levers individually so as to brake the front wheel and the rear wheel synchronously.

According to another advantage of the present invention, when the other one of the two brake levers is driven, the rear wheel is braked so that the rider can operate the other one of the two brake levers individually so as to brake the rear wheel independently.

Further benefits and advantages of the present invention will become apparent after a careful reading of the detailed description with appropriate reference to the accompanying drawings.

DETAILED DESCRIPTION OF THE INVENTION

Figure 1:
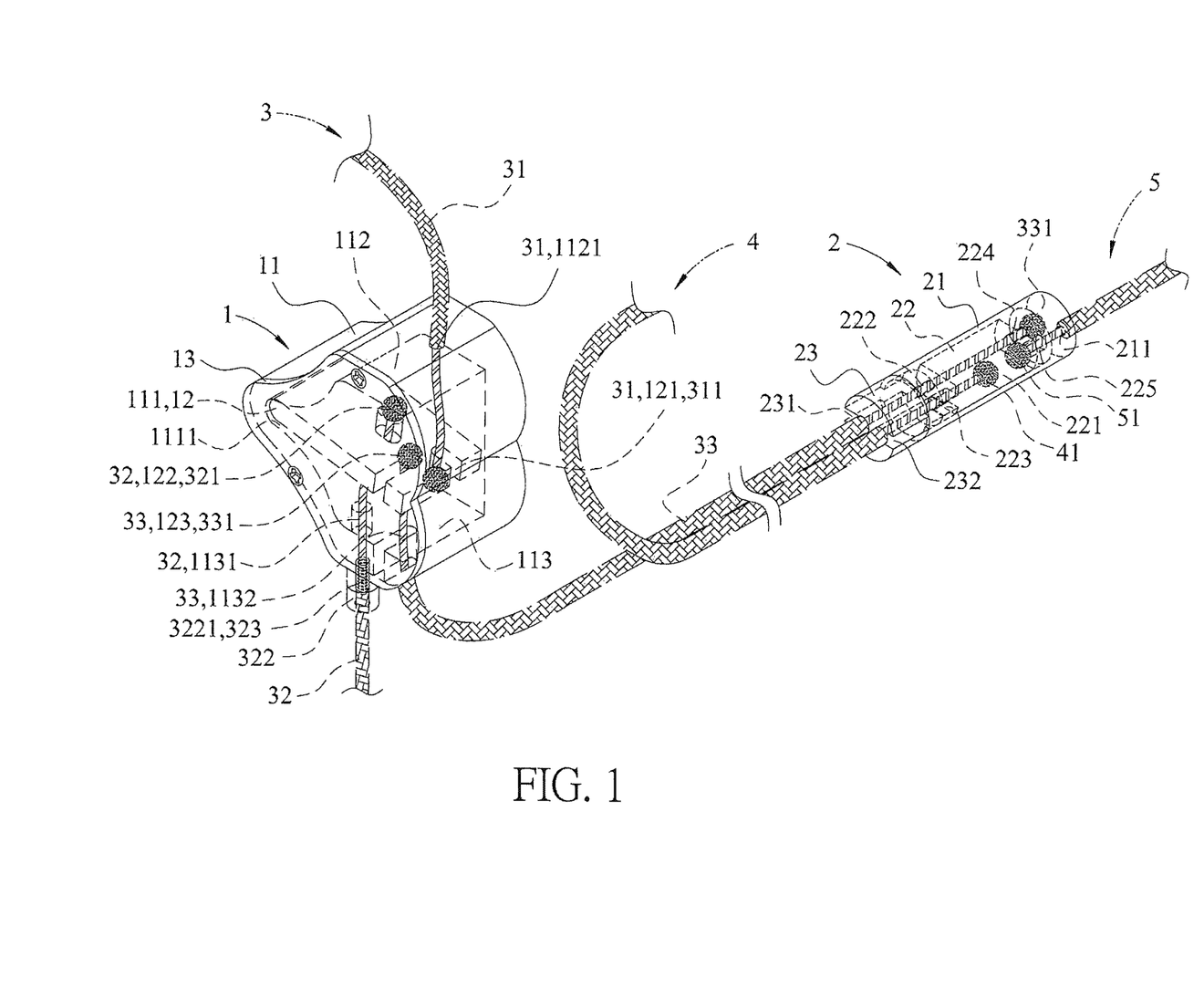
FIG. 1 is a perspective view of a brake auxiliary device in accordance with the preferred embodiment of the present invention.
Figure 2:
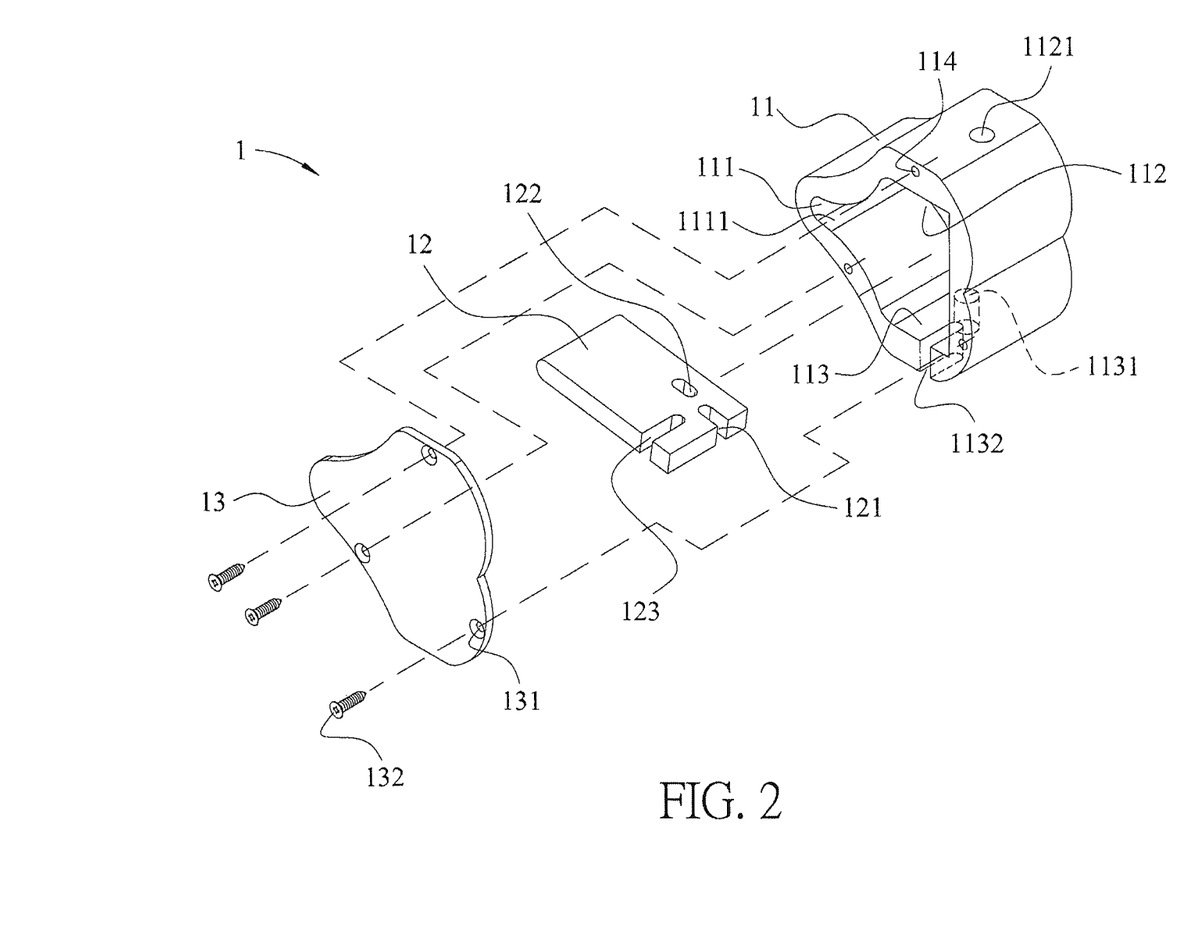
FIG. 2 is an exploded perspective view of a first connecting module of the brake auxiliary device as shown in FIG. 1.
Figure 3:
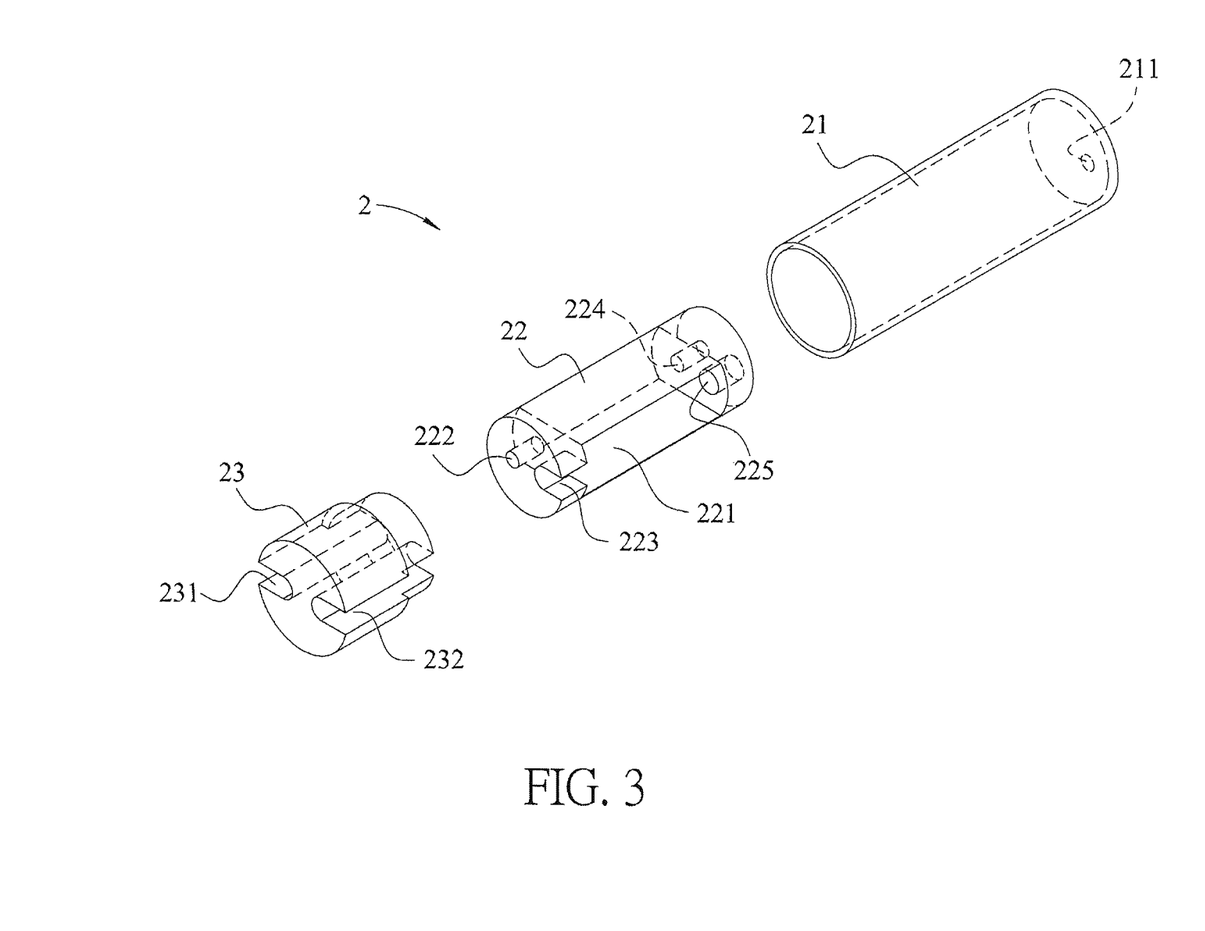
FIG. 3 is an exploded perspective view of a second connecting module of the brake auxiliary device as shown in FIG. 1.

Referring to the drawings and initially to FIGS. 1-3, a brake auxiliary device in accordance with the preferred embodiment of the present invention comprises a first connecting module 1, a brake cable unit 3 connected with the first connecting module 1, a second connecting module 2 connected with the brake cable unit 3, a first brake cable 4 connected with the second connecting module 2, and a second brake cable 5 connected with the second connecting module 2.

The first connecting module 1 includes a casing 11, a driving block 12 mounted in the casing 11, and a cover plate 13 mounted on the casing 11 to cover the driving block 12.

The casing 11 has a recessed shape and has a first end portion 111, a second end portion 112 and a third end portion 113. The first end portion 111, the second end portion 112 and the third end portion 113 of the casing 11 are connected. The first end portion 111 of the casing 11 is provided with a recessed support section 1111 for mounting the driving block 12. The second end portion 112 of the casing 11 is provided with an upper entrance 1121. The third end portion 113 of the casing 11 is provided with a lower entrance 1131 and a slit 1132. The lower entrance 1131 of the casing 11 is arranged at a rear position of the slit 1132. The casing 11 has a front end provided with a plurality of screw bores 114.

The driving block 12 is provided with a mounting hole 122, a first slot 121 and a second slot 123. The first slot 121 of the driving block 12 is formed in a side of the driving block 12. The second slot 123 of the driving block 12 is formed in a front end of the driving block 12. The mounting hole 122 of the driving block 12 has an elongate shape and is arranged at a rear position of the second slot 123. The second slot 123 of the driving block 12 is closer to the first slot 121 than the mounting hole 122.

The cover plate 13 is provided with a plurality of through holes 131 concentric with the screw bores 114 of the casing 11. The first connecting module 1 further includes a plurality of fastening members 132 extended through the through holes 131 of the cover plate 13 and screwed into the screw bores 114 of the casing 11 to lock the cover plate 13 onto the casing 11.

The second connecting module 2 includes a housing 21, a mounting base 22 mounted in the housing 21, and a cap 23 mounted on the housing 21 to cover the mounting base 22.

The housing 21 is a hollow tube and has a bottom provided with a mounting bore 211.

The mounting base 22 has a side provided with a chamber 221. The mounting base 22 has a front end provided with a first aperture 222 and a recess 223. The mounting base 22 has a rear end provided with a second aperture 224 and a third aperture 225. The first aperture 222 and the second aperture 224 of the mounting base 22 are concentric. The third aperture 225 of the mounting base 22 and the mounting bore 211 of the housing 21 are concentric.

The cap 23 is provided with a first channel 231 and a second channel 232 which are arranged at two opposite sides of the cap 23. The second channel 232 of the cap 23 is aligned with the recess 223 of the mounting base 22.

In assembly, the brake cable unit 3 is pivotally connected with the driving block 12 of the first connecting module 1, and is connected to the second connecting module 2. The first brake cable 4 is connected with the front end of the second connecting module 2, and the second brake cable 5 is connected with the rear end of the second connecting module 2.

The brake cable unit 3 includes a control cable 31 extended through the upper entrance 1121 of the casing 11 and connected with the first slot 121 of the driving block 12, a front brake cable 32 extended through the lower entrance 1131 of the casing 11 and connected with the mounting hole 122 of the driving block 12, and a rear brake cable 33 extended through the slit 1132 of the casing 11 and connected with the second slot 123 of the driving block 12. The control cable 31 of the brake cable unit 3 has a first end provided with a connecting head 311 abutting the first slot 121 of the driving block 12. The front brake cable 32 of the brake cable unit 3 has a first end provided with a connecting head 321 abutting the mounting hole 122 of the driving block 12. The rear brake cable 33 of the brake cable unit 3 is extended through the first channel 231 of the cap 23, the first aperture 222 and the second aperture 224 of the mounting base 22. The rear brake cable 33 of the brake cable unit 3 has a first end and a second end each provided with a connecting head 331. The connecting head 331 of the first end of the rear brake cable 33 abuts the second slot 123 of the driving block 12. The connecting head 331 of the second end of the rear brake cable 33 abuts the second aperture 224 of the mounting base 22.

The brake cable unit 3 further includes a cable guide 322 mounted on the lower entrance 1131 of the casing 11 and provided with a receiving space 3221, and an elastic member 323 received in the receiving space 3221 of the cable guide 322 and mounted on the front brake cable 32. The elastic member 323 of the brake cable unit 3 is preferably a spring.

The first brake cable 4 is extended through the second channel 232 of the cap 23 and the recess 223 of the mounting base 22 into the chamber 221 of the mounting base 22. The first brake cable 4 has a first end provided with a connecting head 41 which is received in the chamber 221 of the mounting base 22 and is spaced from the recess 223 of the mounting base 22.

The second brake cable 5 is extended though the mounting bore 211 of the housing 21 and the third aperture 225 of the mounting base 22 into the chamber 221 of the mounting base 22. The second brake cable 5 has a first end provided with a connecting head 51 which is received in the chamber 221 of the mounting base 22 and abuts the third aperture 225 of the mounting base 22.

In practice, referring to FIGS. 4-7 with reference to FIGS. 1-3, the control cable 31 of the brake cable unit 3 has a second end connected to a right brake lever 61 of a bicycle 6, the first brake cable 4 has a second end connected to a left brake lever 62 of the bicycle 6, the front brake cable 32 of the brake cable unit 3 has a second end connected to a front brake 63 of the bicycle 6 to drive a front wheel 64 of the bicycle 6, and the second brake cable 5 has a second end connected to a rear brake 65 of the bicycle 6 to drive a rear wheel 66 of the bicycle 6.

Figure 4:
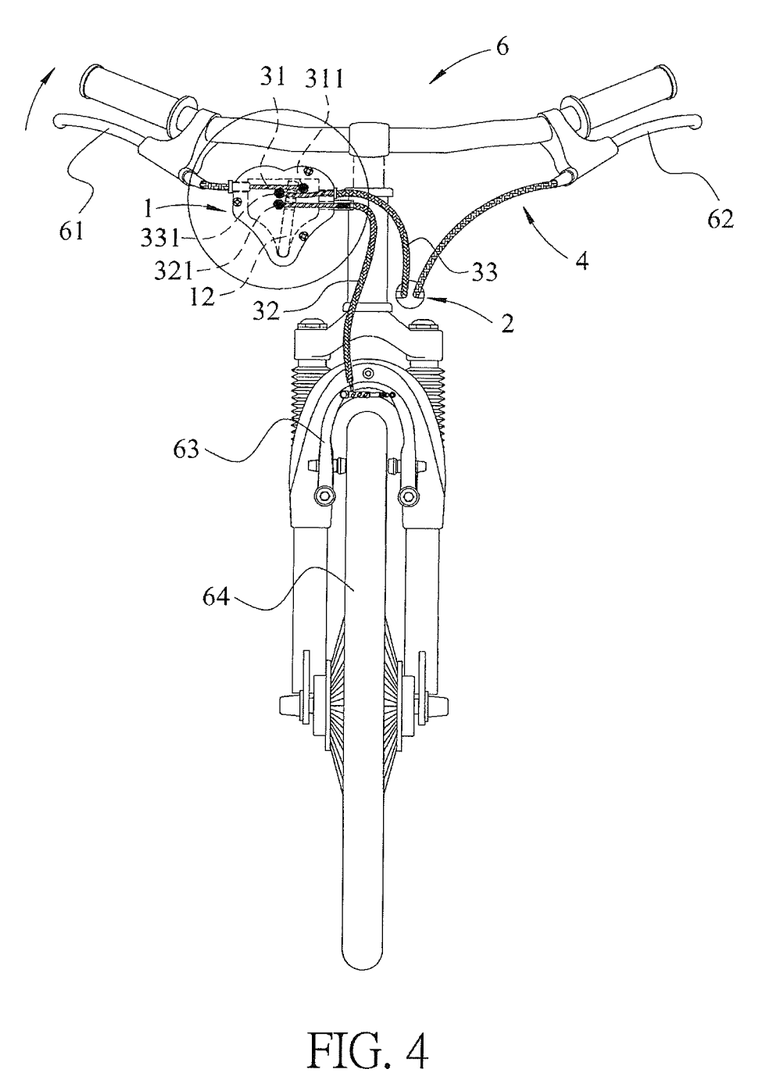
FIG. 4 is a partially front cross-sectional operational view of the brake auxiliary device for a bicycle in accordance with the preferred embodiment of the present invention.
Figure 5:
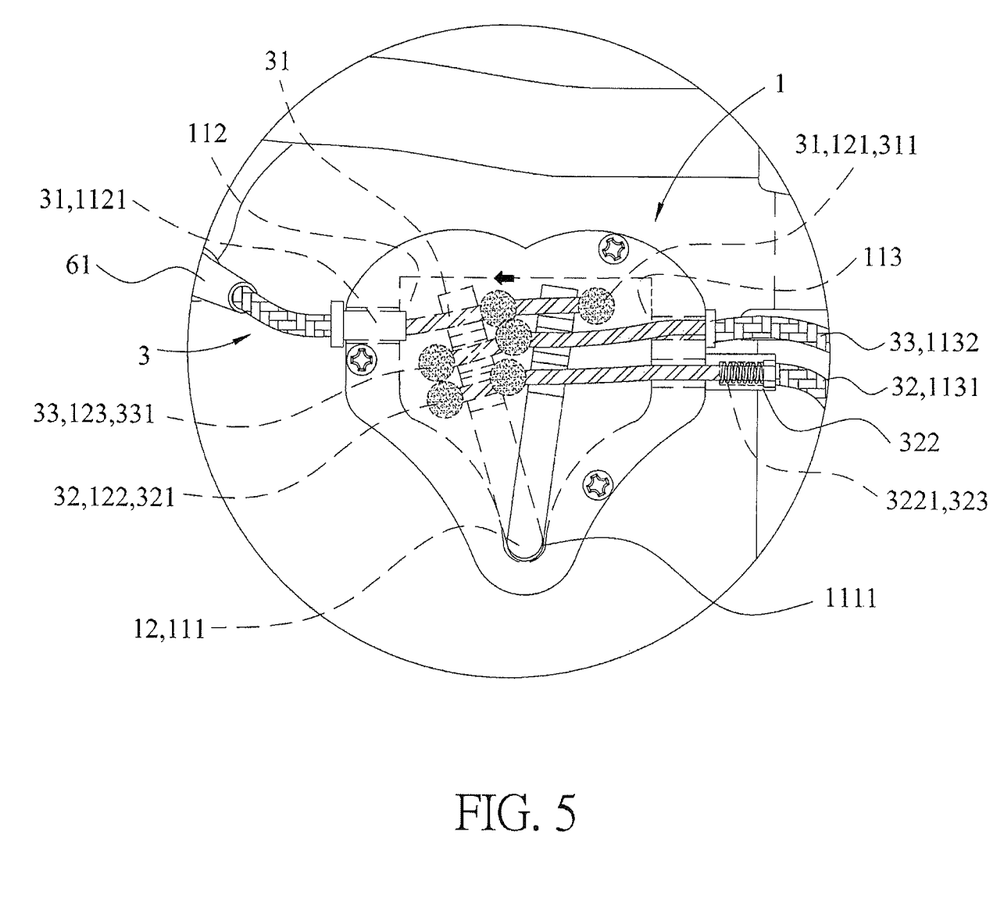
FIG. 5 is a locally enlarged view of the brake auxiliary device for a bicycle as shown in FIG. 4.

In such a manner, when the right brake lever 61 of the bicycle 6 is pressed by the rider as shown in FIG. 4, the control cable 31 of the brake cable unit 3 is driven by the right brake lever 61 to pull the driving block 12 which pulls the front brake cable 32 and the rear brake cable 33 as shown in FIG. 5. After the front brake cable 32 is pulled by the driving block 12, the front brake cable 32 drives the front brake 63 of the bicycle 6 to brake the front wheel 64 of the bicycle 6. After the rear brake cable 33 is pulled by the driving block 12, the rear brake cable 33 drives the second connecting module 2 which drives the second brake cable 5 which drives the rear brake 65 of the bicycle 6 to brake the rear wheel 66 of the bicycle 6. It is to be noted that, the driving block 12 is driven by the control cable 31 through the first slot 121 of the driving block 12, the front brake cable 32 is driven by the mounting hole 122 of the driving block 12, and the rear brake cable 33 is driven by the second slot 123 of the driving block 12. At this time, the second slot 123 of the driving block 12 is closer to the first slot 121 than the mounting hole 122, so that when the driving block 12 is driven by the control cable 31, the rear brake cable 33 is initially driven by the driving block 12 to brake the rear wheel 66 of the bicycle 6, and the front brake cable 32 is then driven by the driving block 12 to brake the front wheel 64 of the bicycle 6. Thus, when the right brake lever 61 is driven, the rear wheel 66 is initially braked, and the front wheel 64 is then braked after the rear wheel 66 is braked.

Figure 6:
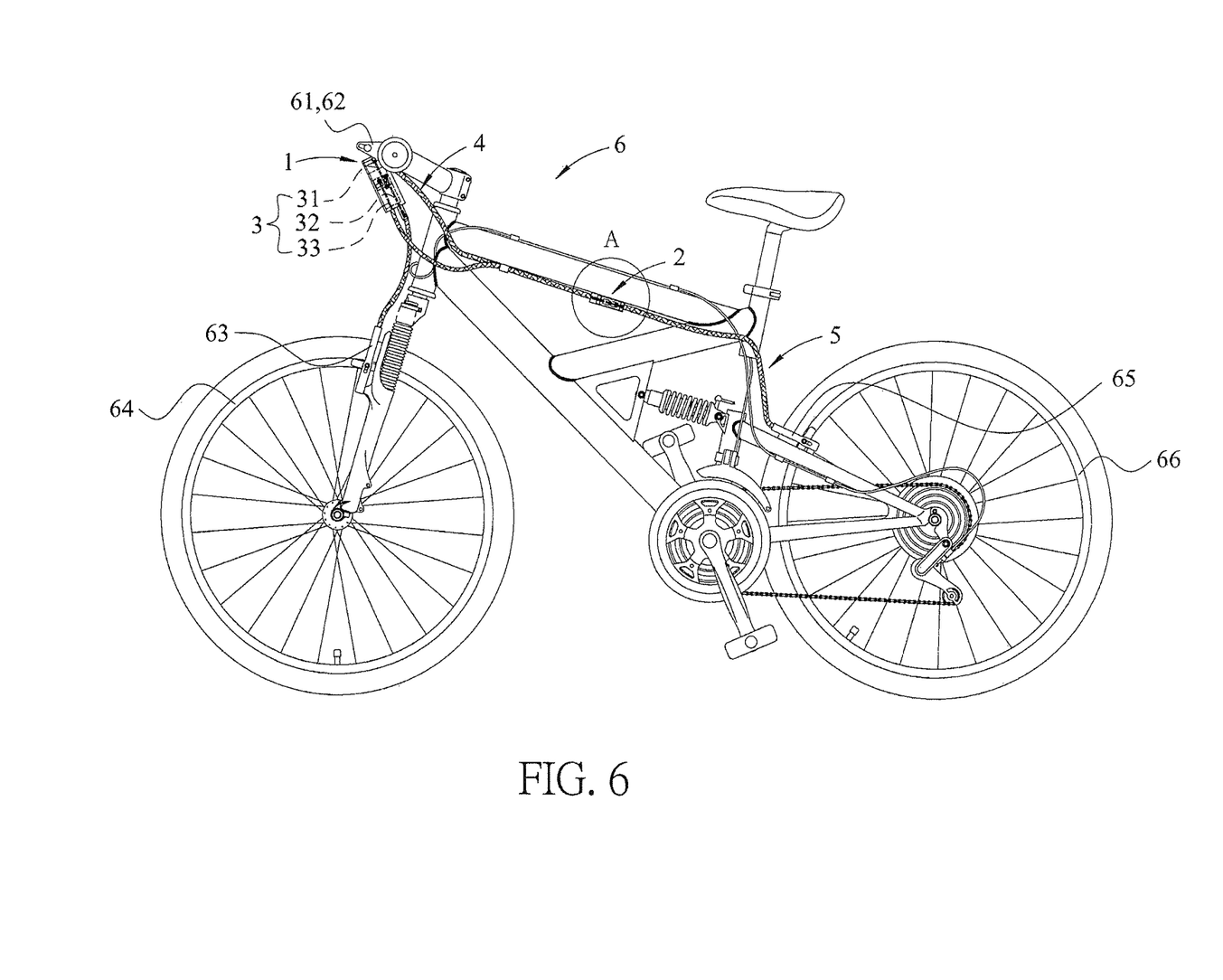
FIG. 6 is a side operational view of the brake auxiliary device for a bicycle in accordance with the preferred embodiment of the present invention.
Figure 7:
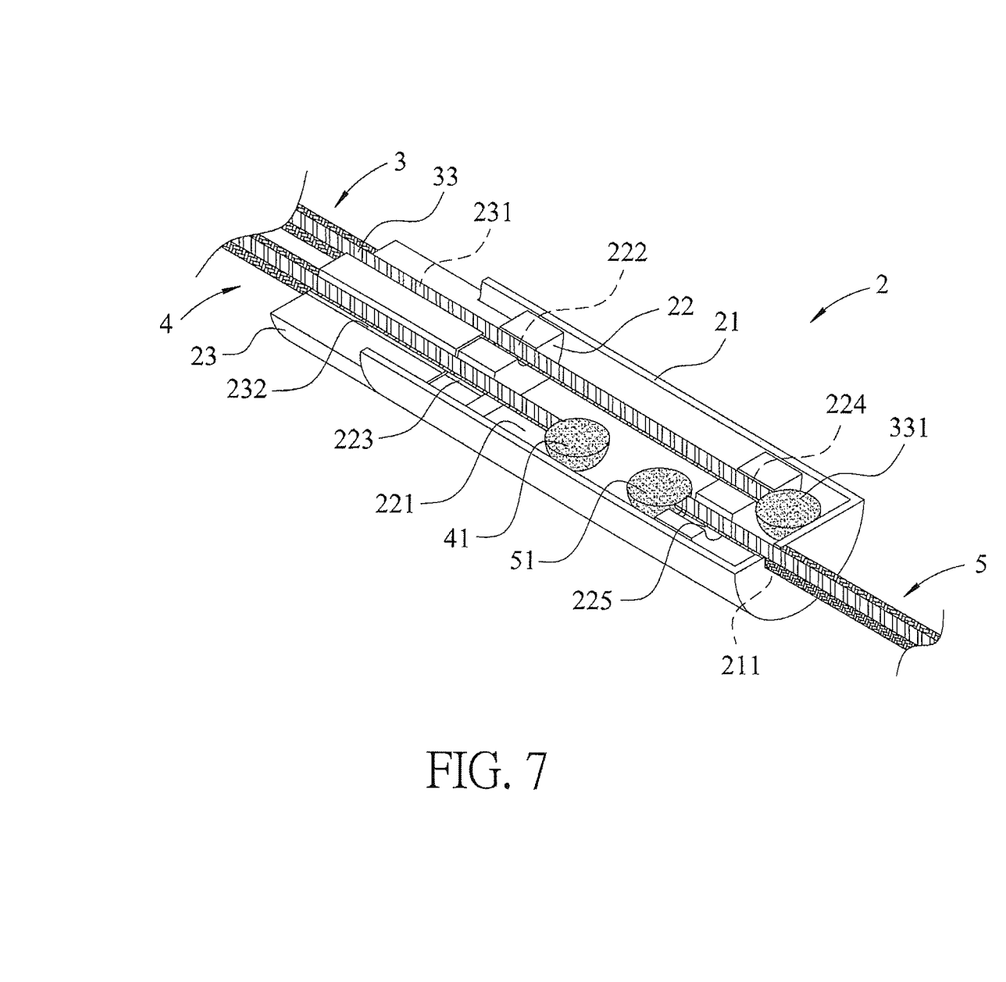
FIG. 7 is a perspective cross-sectional view of the brake auxiliary device as shown in FIG. 6.

Alternatively, when the left brake lever 62 of the bicycle 6 is pressed by the rider, the first brake cable 4 is driven by the left brake lever 62 to drive the second connecting module 2 which drives the second brake cable 5 which drives the rear brake 65 of the bicycle 6 to brake the rear wheel 66 of the bicycle 6. Thus, when the left brake lever 62 is driven, the rear wheel 66 is braked simultaneously as shown in FIG. 6.

Accordingly, when the right brake lever 61 is driven, the rear wheel 66 is initially braked, and the front wheel 64 is then braked after the rear wheel 66 is braked, so that the rider only needs to operate the right brake lever 61 individually so as to brake the front wheel 64 and the rear wheel 66 synchronously. In addition, when the left brake lever 62 is driven, the rear wheel 66 is braked so that the rider can operate the left brake lever 62 individually so as to brake the rear wheel 66 independently.

Although the invention has been explained in relation to its preferred embodiment(s) as mentioned above, it is to be understood that many other possible modifications and variations can be made without departing from the scope of the present invention.

The invention claimed is:

1. A brake auxiliary device, comprising:
   a first connecting module;
   a brake cable unit connected with the first connecting module;
   a second connecting module connected with the brake cable unit;
   a first brake cable connected with the second connecting module; and
   a second brake cable connected with the second connecting module;
   wherein:
   the first connecting module includes:
   a casing;
   a driving block mounted in the casing; and
   a cover plate mounted on the casing to cover the driving block;
   the casing has a first end portion, a second end portion and a third end portion;
   the first end portion of the casing is provided with a support section for mounting the driving block;
   the second end portion of the casing is provided with an upper entrance;
   the third end portion of the casing is provided with a lower entrance and a slit;
   the driving block is provided with a mounting hole, a first slot and a second slot;
   the second connecting module includes:
   a housing;
   a mounting base mounted in the housing; and
   a cap mounted on the housing to cover the mounting base;
   the housing has a bottom provided with a mounting bore;
   the mounting base has a side provided with a chamber;
   the mounting base has a front end provided with a first aperture and a recess;
   the mounting base has a rear end provided with a second aperture and a third aperture;
   the cap is provided with a first channel and a second channel;
   the brake cable unit is pivotally connected with the driving block of the first connecting module;
   the brake cable unit is connected to a front brake of a bicycle; and
   the second brake cable is connected to a rear brake of the bicycle.

2. The brake auxiliary device of claim 1, wherein:
   the brake cable unit includes:
   a control cable extended through the upper entrance of the casing and connected with the first slot of the driving block;
   a front brake cable extended through the lower entrance of the casing and connected with the mounting hole of the driving block; and
   a rear brake cable extended through the slit of the casing and connected with the second slot of the driving block;
   the first brake cable is connected with a front end of the second connecting module; and
   the second brake cable is connected with a rear end of the second connecting module.

3. The brake auxiliary device of claim 2, wherein the mounting hole of the driving block has an elongate shape.

4. The brake auxiliary device of claim 2, wherein:
   the control cable of the brake cable unit has a first end abutting the first slot of the driving block and a second end connected to a right brake lever of the bicycle;
   the front brake cable of the brake cable unit has a first end abutting the mounting hole of the driving block and a second end connected to the front brake of the bicycle;
   the first brake cable has a first end received in the chamber of the mounting base and spaced from the recess of the mounting base and a second end connected to a left brake lever of the bicycle; and
   the second brake cable has a first end received in the chamber of the mounting base and abutting the third aperture of the mounting base and a second end connected to the rear brake of the bicycle.

5. The brake auxiliary device of claim 2, wherein the brake cable unit further includes a cable guide mounted on the lower entrance of the casing.

6. The brake auxiliary device of claim 5, wherein:
   the cable guide is provided with a receiving space; and
   the brake cable unit further includes an elastic member received in the receiving space of the cable guide and mounted on the front brake cable.

7. The brake auxiliary device of claim 6, wherein the elastic member of the brake cable unit is a spring.

8. The brake auxiliary device of claim 1, wherein:
   the rear brake cable of the brake cable unit is extended through the first channel of the cap, the first aperture and the second aperture of the mounting base;
   the rear brake cable of the brake cable unit has a first end abutting the second slot of the driving block and a second end abutting the second aperture of the mounting base;
   the first brake cable is extended through the second channel of the cap and the recess of the mounting base into the chamber of the mounting base; and
   the second brake cable is extended though the mounting bore of the housing and the third aperture of the mounting base into the chamber of the mounting base.

9. The brake auxiliary device of claim 8, wherein:
   the first aperture and the second aperture of the mounting base are concentric;
   the third aperture of the mounting base and the mounting bore of the housing are concentric; and
   the second channel of the cap is aligned with the recess of the mounting base.

10. The brake auxiliary device of claim 1, wherein the first connecting module further includes a plurality of fastening members extended through the cover plate and screwed into the casing to lock the cover plate onto the casing.

* * * * *